*T. Williams,*

*Insect Trap.*

No. 109,282. Patented Nov. 15, 1870.

Witnesses:
Gustave Dieterich
L. S. Mabee

Inventor:
T. Williams
per [Attorneys signature]
Attorneys.

United States Patent Office.

THOMAS WILLIAMS, OF TOMPKINSVILLE, NEW YORK.

Letters Patent No. 109,282, dated November 15, 1870.

IMPROVEMENT IN ROACH AND BUG-TRAPS.

The Schedule referred to in these Letters Patent and making part of the same.

*To all whom it may concern:*

Be it known that I, THOMAS WILLIAMS, of Tompkinsville, in the county of Richmond and State of New York, have invented a new and improved Roach and Bug-Trap; and I do hereby declare that the following is a full, clear, and exact description thereof, which will enable others skilled in the art to make and use the same, reference being had to the accompanying drawing forming part of this specification.

Similar letters of reference indicate corresponding parts.

Figure 1:
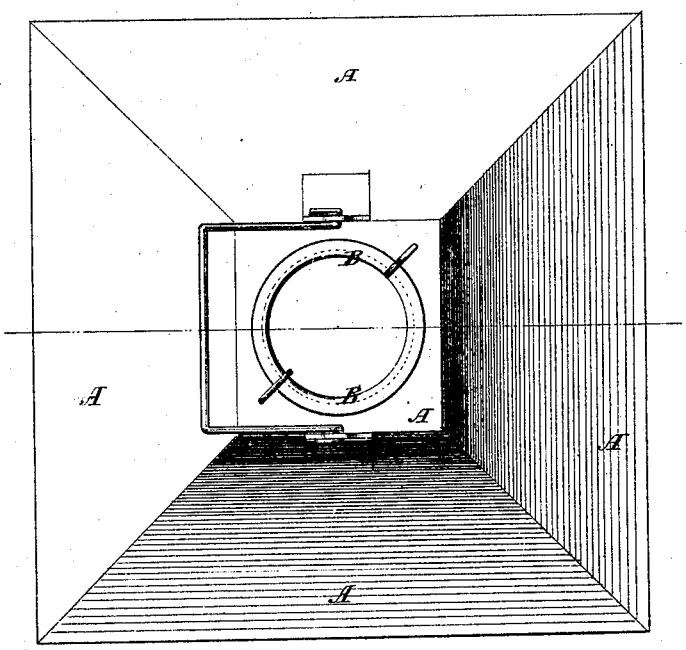
Figure 1 represents a plan or top view of my improved roach and bug-trap.
Figure 2:
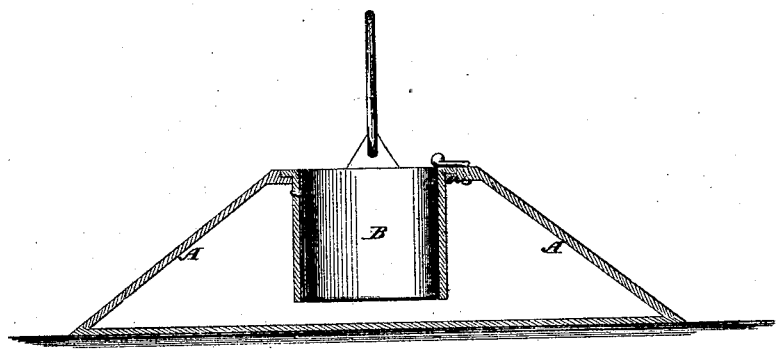
Figure 2 is a vertical section of the same.

This invention relates to a new device for catching croton-bugs, cockroaches, and other creeping insects; and It consists in the arrangement of a smooth entrance, which is so placed that the animals cannot crawl out of the same.

A in the drawing represents a case or box, made with inclined sides and open on top. It is made of wood or other suitable material.

B is a cylindrical or slightly conical vessel, suspended by means of an outer flange, *a*, or otherwise, from the top of the box.

This vessel B is made of glass, or otherwise provided with a highly polished and smoothened inner surface. It is open at both ends, its lower end reaching nearly to the bottom of the box A.

The operation is as follows:

Food of some kind apt to attract the insect is placed within the box. The bugs will readily ascend the inclined sides of the box, and, as they can plainly see or perceive the food at the bottom of the same, will drop themselves into the box or descend along the smooth sides of the cylinder, on which they cannot reascend. They are thus helplessly caught, and can be destroyed in suitable manner.

Having thus described my invention,

I claim as new and desire to secure by Letters Patent—

A removable vessel, B *a*, having a glass or other equivalent smooth inner surface, and suspended as described, combined with the box A, all constructed as and for the purpose specified.

THOMAS WILLIAMS.

Witnesses:
GEO. W. MABEE,
T. B. MOSHER.